United States Patent [19]
O'Connor et al.

[11] 3,760,263
[45] Sept. 18, 1973

[54] FLAW DETECTOR FOR SQUARE BILLETS USING MAGNETIC TAPE HELICALLY MOVED ABOUT SAID BILLETS

[75] Inventors: Donald T. O'Connor, Barrington; Peter J. Rosauer, Mount Prospect; Donald E. Lorenzi, Des Plaines, all of Ill.

[73] Assignee: Magnaflux Corporation, Chicago, Ill.

[22] Filed: May 20, 1971

[21] Appl. No.: 145,316

[52] U.S. Cl. .................................................. 324/37
[51] Int. Cl. ............................................. G01r 33/12
[58] Field of Search ....................................... 324/37

[56] References Cited
UNITED STATES PATENTS

| | | | |
|---|---|---|---|
| 3,656,054 | 4/1972 | Forster | 324/37 |
| 3,341,771 | 9/1967 | Crouch et al. | 324/37 |
| 3,593,120 | 7/1971 | Mandula, Jr. | 324/37 |
| 3,539,915 | 11/1970 | Walters et al. | 324/37 |
| 3,262,053 | 7/1966 | Nasir et al. | 324/37 |

*Primary Examiner*—Robert J. Corcoran
*Attorney*—Hill, Sherman, Meroni, Gross & Simpson

[57] ABSTRACT

A method and apparatus for inspecting an elongated magnetic object for structural flaws includes a magnetic tape entrained for movement on a support structure, and the support structure and the object are moved relative to one another about a longitudinal axis of the object. The tape is moved through a predetermined path relative to the support structure and into pressure engagement with a peripheral surface of the object to be inspected so that a magnetic flux pattern along the peripheral surface of the object is recorded on the tape during relative rotation of the support structure and the object. A pick-up head disposed at a remote location along the path of movement of the tape reads the flux pattern recorded on the tape, and an erase head erases the recorded flux pattern after it is read from the tape by the pick-up head.

11 Claims, 10 Drawing Figures

Patented Sept. 18, 1973

INVENTORS
DONALD T. O'CONNOR
PETER J. ROSAUER
DONALD E. LORENZI
BY
ATTORNEYS

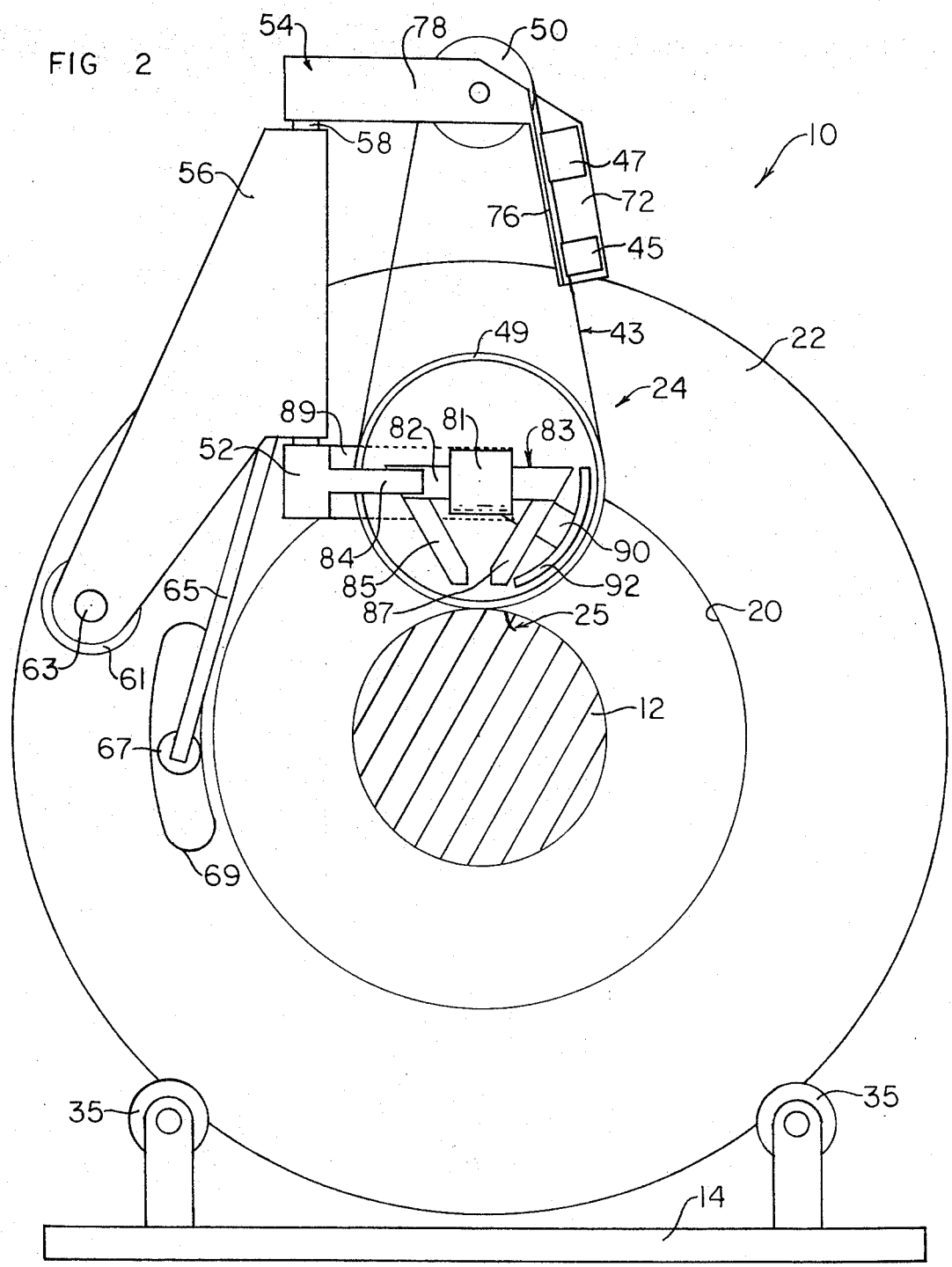

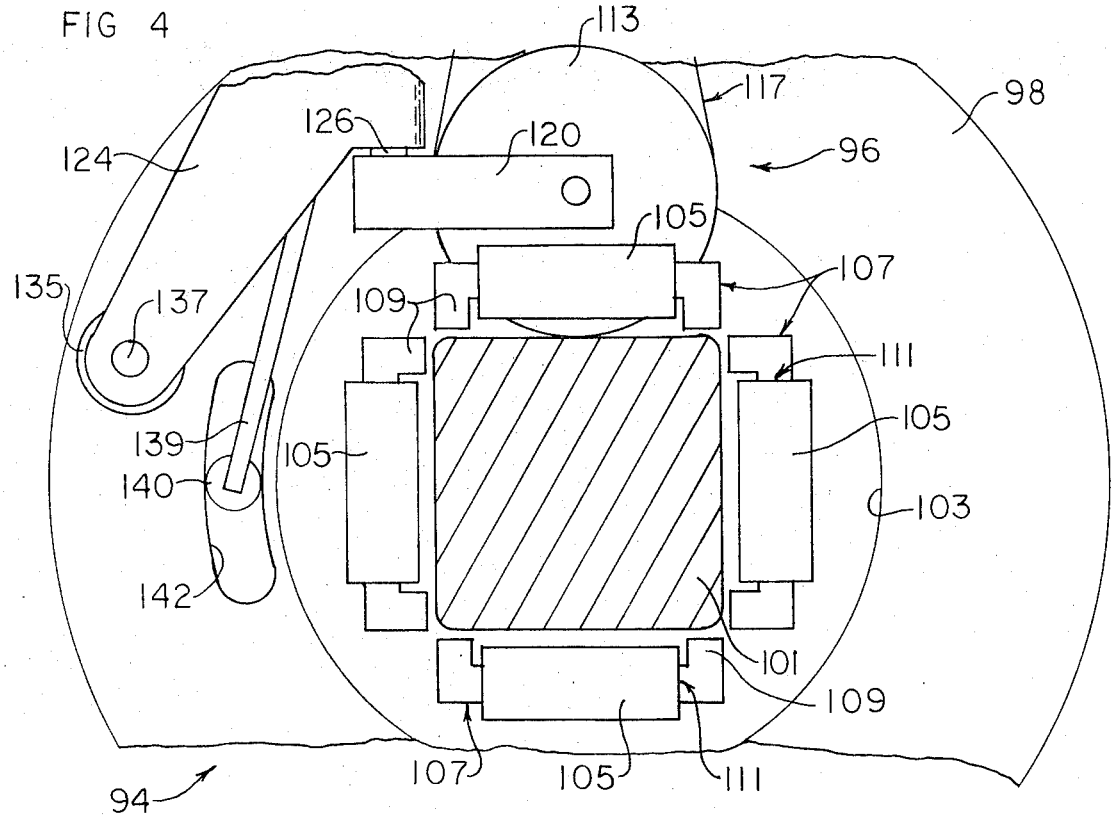
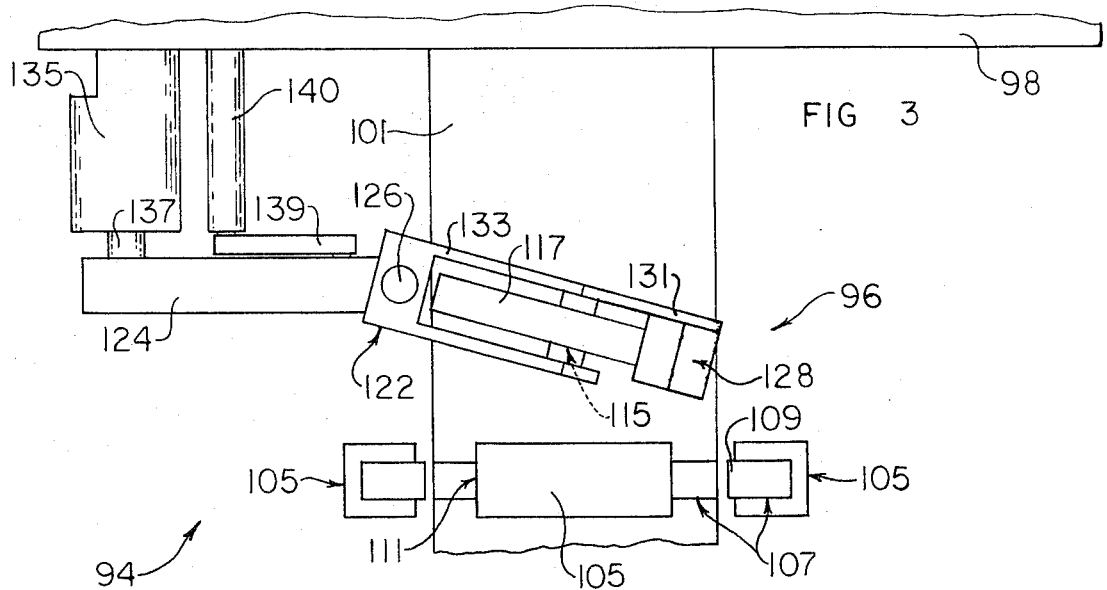

INVENTORS
DONALD T. O'CONNOR
PETER J. ROSAUER
DONALD E. LORENZI

BY *[signature]*
*[signature]* ATTORNEYS

Patented Sept. 18, 1973

INVENTORS
DONALD T. O'CONNOR
PETER J. ROSAUER
DONALD E. LORENZI

BY *Hill Sherman Meroni*
*Gross & Simpson* ATTORNEYS

FLAW DETECTOR FOR SQUARE BILLETS USING MAGNETIC TAPE HELICALLY MOVED ABOUT SAID BILLETS

The present invention relates to a method and apparatus for flaw detection, and it more particularly relates to an apparatus and method for magnetically inspecting the peripheral surface of an elongated object composed of magnetic material for structural flaws.

Many different types of magnetic inspection apparatus have been used for inspecting magnetic objects for structural flaws. In this regard, the peripheral surface of the object to be inspected is magnetized so that the flux leakage at the surface of the object varies where the structure is not uniform. Where a flaw, such as a crack or split, is located in the object, a variation in the flux leakage occurs, since north and south magnetic poles are established on opposite sides of the flaw. According to one such technique, in order to inspect the flux pattern along a peripheral surface of an object, a pick-up head or other magnetic detection device is moved longitudinally along the peripheral surface of the object. After completing a longitudinal movement of the pick-up head, the object is rotated about its axis, and then the longitudinal movement of the head is repeated along a fresh portion of the surface to be inspected. This operation is repeated to inspect the entire surface of the object. According to another technique, a series of pick-up heads are mounted on a support structure and surround the object to be inspected. The support structure is moved along the object in an axial direction to record the flux pattern in a single pass of the structure relative to the object. However, these techniques have not been entirely satisfactory, since there is an undue and unwanted time delay in making the repeated longitudinal movements of the pick-up heads relative to the object to be inspected and the use of a plurality of sensitive pick-up heads is unduly expensive. Also, it has been difficult, if not impossible, to obtain an accurate recording of a flux pattern at irregularities, such as concave surface areas, on the object due to the difficulty of enabling the heads to follow the irregular-shaped contours of the object. Therefore, it would be highly desirable to have a magnetic inspection apparatus which employs a single pick-up head, and which inspects the entire peripheral surface of an object in a single longitudinal relative movement of the apparatus and the object. Moreover, it would be desirable to have such an apparatus which can accurately record a flux pattern of an object having irregularly shaped surface contours.

Therefore, the principal object of the present invention is to provide a new and improved method and apparatus for flaw detection.

Another object of the present invention is to provide a new and improved method and apparatus for the magnetic inspection of the entire peripheral surface area of an elongated object of magnetic material, which inspection can be accomplished during a single relative longitudinal movement of a single pick-up head and the object.

A further object of the present invention is to provide a new and improved method and apparatus for accurately and rapidly detecting flaws in various different sizes and shapes of elongated objects.

Briefly, the above and further objects are realized in accordance with the present invention by providing flaw detection apparatus, which includes a magnetic tape or belt entrained for movement on a support structure in a predetermined path relative to the support structure. A mechanism for effecting relative rotation of the support structure and the object to be inspected about a longitudinal axis of the object, and a mechanism operative at a portion of the path of movement of the belt for pressing the belt into frictional engagement with a peripheral surface of the object. The belt includes a magnetic material for recording along the length of the belt the magnetic flux pattern along the peripheral surface of the object during relative rotation of the support structure and the object. The support structure is free to pivot about an axis which is perpendicular to the direction of movement of the object, so that the area of interengagement of the belt and the object moves in a generally helical path, whereby substantially the entire surface area of the object may be inspected. Moreover, in order to accurately record the flux pattern from an irregularly shaped object, such as an object having concave surfaces, there is provided an inflated resilient hollow roller member rotatably mounted on the support structure for firmly pressing the belt into engagement with the irregular contour of the peripheral surface of the object so that the belt remains in contact therewith during the course of inspecting the object.

Other objects and advantages of the invention will be evident from the following detailed description when read in conjunction with the accompanying drawings, wherein:

FIG. 2 is a front elevational view of the apparatus of FIG. 1;

FIG. 3 is a fragmentary, partially-schematic plan view of another magnetic inspection apparatus, which is constructed in accordance with the present invention for detecting structural flaws in elongated objects;

FIG. 4 is a fragmentary, partially schematical elevational view of the apparatus of FIG. 3;

Figures 1, 1A:
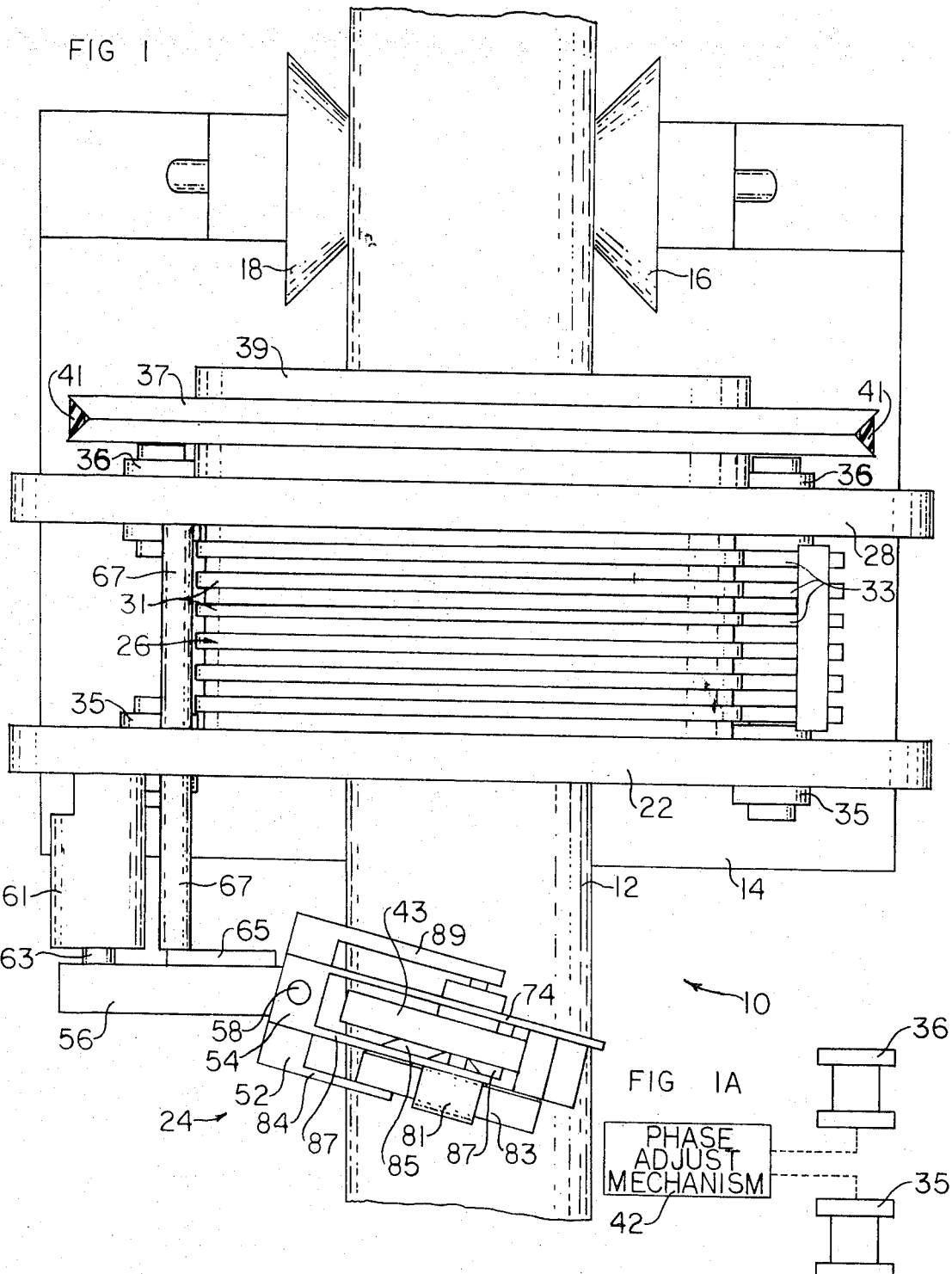
FIG. 1 is a fragmentary, cross-sectional plan view of magnetic inspection apparatus which is constructed in accordance with the present invention and which is adapted to inspect an elongated object for structural flaws.
FIG. 1A is a view illustrating diagrammatically a drive arrangement for adjusting the relative rotational position of two plates of the apparatus of FIG. 1.

Referring now to the drawings, and more particularly to FIGS. 1 and 2 thereof, there is shown a magnetic inspection apparatus 10 which inspects an elongated object, such as the cylindrical billet 12 or the like, and which is constructed in accordance with the principles of the present invention. The billet 12 is composed of magnetic material and is circumferentially magnetized by conventional means (not shown). The apparatus 10 includes a frame 14 which has a pair of oppositely disposed conical rollers 16 and 18 for guiding the billet 12 in a longitudinal direction from the rollers 16 and 18 to and through a circular opening 20 (FIG. 2) in an annular plate 22, which is rotatably mounted on the frame 14 and which has a recording assembly 24 mounted thereon for revolving about the axis of the billet 12 as it moves longitudinally therepast, whereby the entire magnetic flux pattern of the external peripheral surface of the billet 12 is recorded by the recording assembly to detect structural flaws, such as the flaw 25 (FIG. 2) in the billet 12. A slip ring assembly 26 is mounted between and in axial alignment with the annular plate 22 and a second annular plate 28, and comprise a plurality of rotatable annular contact rings 31 which are fixed to the plates 22 and 28, and which engage a plurality of stationary brushes 33 to electrically connect the recording assembly 24 to suitable output means (not shown), such as an oscilloscope. Two sets of rollers 35 and 36 mounted on the frame 14 rollably support the annular plates 22 and 28 from below, and a pulley 37 fixed to an annular boss or hub 39 of the plate 28 is driven by a motor (not shown) which is supported above the plates 22 and 28 and which is drivingly connected to the pulley 37 by means of a belt 41. The motor drives the plate 28 and the slip rings 26 about the longitudinal axis of the billet 12 in a counterclockwise direction as viewed in FIG. 2, plate 28 and slip rings 26 being rigidly connected to the pulley 37. Plate 22 is rotatable to a limited extent relative to the plate 28 but is driven therefrom through an arrangement illustrated diagrammatically in FIG. 1A. Support rollers 36 are driven from the plate 28 and drive the support rollers 35 through a phase adjustment mechanism 42. Support rollers 35 drive the plate 22 at the same speed as that of the plate 28 but in an adjustable rotational relationship thereto. The purpose of this arrangement is described hereinafter. Mechanism 42 is of a type known in the art.

Considering now the recording assembly 24 in greater detail, the assembly 24 includes an endless magnetic tape or belt 43, which is used for recording the magnetic flux pattern on the peripheral surface of the billet 12 and which continuously moves in a circuitous, endless path relative to the support plate 22 in a counterclockwise direction as viewed in FIG. 2, and which is pressed into engagement with the outer peripheral surface of the billet 12 as the tape 43 and the plate 22 revolve about the billet 12. A read or pick-up head 45 is disposed adjacent a portion of the path of movement of the tape 43 remote from the billet 12 to read the recorded flux pattern from the tape 43 as it moves in its counterclockwise direction past the pick-up head 45, and an erase head 47 is disposed adjacent the path of movement of the tape 45 to erase the tape after it is read by the pick-up head 45, whereby the erased tape 43 is then conveyed to the billet 12 for further recording of the flux pattern of the billet. A large cup-shaped guide roller 49 guides the tape 43 into engagement with the external peripheral surface of the billet 12, and a smaller cup-shaped idler roller 50 is axially spaced from the larger roller 49 to guide the endless tape 43 in its closed-loop path, whereby as the plate 22 rotates, the guide roller 49 frictionally engages the billet 12 and rotates thereabout to drive the tape 43 in its path of movement. A pair of spaced-apart yokes 52 and 54 support the respective rollers 49 and 50 and are pivotally mounted to a support arm 56 by means of a pivot shaft 58 which extends therethrough, and the support arm 56 is pivotally mounted at 63 to a block 61 which is mounted on the face of the support plate 22. Thus, as seen in FIG. 1, the assembly 24 is pivotable about the axis of the pivot shaft 58, which extends in a direction perpendicular to the direction of movement of the billet 12, to permit the recording assembly 24 to be free to align itself with a helical path of movement of the tape 43 as it engages the longitudinally movable billet 12 so that the entire peripheral surface of the billet is engaged by the tape 43 during a single movement of the billet 12 relative to the rotating assembly 24. The assembly 24 is also pivotable about the axis 63 to permit the assembly 24 to be pivotally moved in a plane perpendicular to the axis of the billet 12 to enable the apparatus 10 to accommodate various different sizes and shapes of billets. In order for the recording assembly 24 and its tape 43 to follow the external surface of the object to be inspected, a spring 65 is stretched between the arm 56 and a rod 67 which rides in an arcuate slot 69 in the face of the support plate 22. Spring 65 normally biases the assembly 24 and its tape 43 into engagement with the peripheral surface of the object 12 and to maintain the moving tape 43 in engagement with the moving billet 12 as the plate 22 revolves thereabout. Rod 67 is affixed to the plate 28 and when the trailing end of a billet is reached, the rotational position of the plate 22 is adjusted by the mechanism 42 to release the spring tension and to allow the assembly 24 to move radially outwardly. When the leading end of the next billet appears, the rotational position of the plate 22 relative to the plate 28 is adjusted in the reverse direction to move the assembly radially inwardly and to engage the tape 43 with the new billet.

A downwardly depending extension 72 of a rear arm 74 of the upper yoke 54 supports the heads 45 and 47, and a downwardly depending extension 76 of the front arm 78 of the yoke 54 serves as a back-up plate for the heads 45 and 47 to press the tape thereagainst, it being understood that the tape 43 is shown in the drawings to be spaced from the plate 76 for illustration purposes.

A magnetic biasing coil 81 wrapped about a web portion 82 of a generally U-shaped yoke 83 provides a biasing magnetic field for magnetizing the portion of the tape 43 engaging the billet 12, thereby sensitizing the tape 43 to provide greater accuracy of the recording. An arm 84 of the lower yoke 52 supports the yoke 83 and is fixed to the web portion 82 thereof so that a pair of pole pieces 85 and 87 of the yoke 83 extend from the web portion 82 into the interior of the guide roller 49 and have distal end portions which are closely spaced and disposed adjacent the portion of the roller 49 which presses the tape 43 into engagement with the billet 12. A rearwardly disposed longer arm 89 of the yoke 52 rotatably supports the roller 49 and has an extension or arm 90 which in turn supports an arcuate shield 92 disposed adjacent the inner surface of the roller 49 adjacent the pole piece 87 of the yoke 83. The shield 92 is thus disposed along the path of movement of the tape 43 between the distal end of the pole piece 87 and the pick-up head 45 to prevent disruption of the recording of the magnetic flux pattern on the tape until the signals are read by the pick-up head 45 and then subsequently erased by the head 47. The coil 81 is energized by a source of potential (not shown) which is electrically connected to the coil via the slip rings 26.

OPERATION

The inspection of the apparatus 10 is initiated by pivoting the assembly 24 about its pivot point 63 in a counterclockwise direction as viewed in FIG. 2 away from the opening 20 in the plate 22 and against the force of the spring 65, and then by moving the billet 12 lengthwise along the rollers 16 and 18 through the support plates 22 and 28 and the slip rings 26 to a point opposite the assembly 24. The tape 43 is then moved into engagement with the outer peripheral surface of the billet 12 by rotating the recording assembly 24 about the pivot point 63 in a clockwise direction until the tape 43 is pressed into frictional engagement with the billet 12 and is maintained in engagement with the billet by the bias spring 65. The motor (not shown) is then started to cause the plates 22 and 28 and the rings 31 of the slip rings 26 to rotate about the longitudinal axis of the billet 12 so that the tape 43 of the recording assembly 24 rotates about the billet 12. In so doing, the guide roller 49 is driven in a counterclockwise direction as viewed in FIG. 2 to cause the tape 43 to move through its endless path, whereby the magnetic flux pattern of the billet 12 is recorded on a portion of the tape 43 which moves relative to the support arms 78, 84 past the pole pieces 85 and 87 and then the shield 92 until it reaches a position opposite the pick-up head 45. The signals recorded on the tape 43 are thus read therefrom and transferred to the output means, such as an oscilloscope. Thereafter, the tape moves past the erase head 47 which erases the tape 43 so that the erased portion of the tape continues to move past the idler roller 50 and thence to the guide roller 49 and into engagement with the surface of the billet 12.

After the recording assembly 24 commences rotation, the billet 12 is fed lengthwise from the guide rollers 16 and 18 through the support plate 28 and the slip rings 26, and then through the opening 20 in the plate 22. As the tape 24 moves relative to the support arms 78, 84 through its endless path and as the recording assembly 24 revolves about the billet 12, the rollers 49 of the assembly 24 pivots about the pivot point 58 of the roller 49, and thus the path of movement of the interengaged portions of the tape 43 and the billet to be a generally helical path determined by the configuration of the billet, the linear speed thereof and the rotational speed of assembly 24. As a result, the tape 43 records the flux pattern of the billet 12 over its entire peripheral surface area as the billet 12 moves past the rotating recording assembly 24 during a single pass over the billet. The billet 12 may be manually fed past the recording assembly 24, or it may be fed from a motor-driven feed mechanism (not shown) to a pick-up mechanism (not shown) disposed remote from and in front of the assembly 24. Moreover, by using the drive arrangement shown diagrammatically in FIG. 1A, in line operation of the apparatus 10 may be accomplished.

Referring now to FIGS. 3 and 4 of the drawings, there is shown a magnetic inspection apparatus 94, which is constructed in accordance with the present invention, and which is similar to the apparatus 10 of FIG. 1 except that the apparatus 94 employs stationary bias coils. The apparatus 94 includes a rotatable recording assembly 96 mounted to a rotatable motor-driven annular support plate 98, which is similar to the support plate 22 of FIG. 1 and which rotates about the axis of an elongated square-shaped billet 101 fed through a circular opening 103 in the support plate 98. A plurality of stationay bias coils 105 are wound on generally U-shaped yokes 107, and are mounted on a stationary support bracket (not shown) near the assembly 96 to surround the billet 101 as it moves through the apparatus 94. Pairs of spaced-apart pole pieces 109 of the yokes 107 are integral with and extend from web portions 111 about which are wrapped the coils 105. The pole pieces are positioned in closely spaced relationship with the peripheral surface of the billet 101 near the corners thereof to magnetize the peripheral surface of the billet 101, thereby to provide a biasing magnetic field for the tape in the same manner as the coils 81 of FIG. 1. By mounting the coils 105 and the yokes 107 separately from the rotatable assembly 96, the total weight of the assembly 96 is reduced, thereby permitting the use of a smaller size drive motor and aiding the variations of pressure between the roller and the billet caused by the inertia forces produced by the recording assembly 96 acting on the tension of the spring biasing the assembly into position.

The rotating recording assembly 96 includes a pair of axially spaced rollers 113 and 115 which support an endless magnetic tape or belt 117 for movement through an endless path in the same manner as the tape 43 of FIG. 1. A pair of yokes 120 and 122 rotatably support the respective rollers 113 and 115 and are pivotally mounted on an arm 124 to enable the assembly 96 to freely pivot about the axis of a pivot shaft 126 which connects the yokes 120 and 122 to the arm 124, whereby the assembly 96 is free to seek a position, as seen in FIG. 3, in alignment with the natural helical path of movement of the tape 117 and the peripheral surface of the billet 101 in the same manner as the assembly 24 of FIG. 1. As shown in FIG. 3, a pick-up head and an erase head generally indicated at 128 are mounted on an extension 131 of the rear arm 133 of the upper yoke 122 in the same manner as the heads 45 and 47 of FIG. 2.

A support block 135 which is mounted to the face of the support plate 98 has an end portion of the arm 124 pivotally connected to the end of the block 135 at 137 so that the assembly 96 can be pivoted about the axis 137 to accommodate various different sizes of billets in the same manner as the assembly 24 of FIG. 1. While the billet 101 has been shown and described to the square in cross-section, and the billet 12 has been disclosed to be circular in cross-section, it is to be understood that other cross-sectional shapes may also be accommodated by the apparatus of the present invention. A spring 139 is stretched between the arm 124 and a post 140 which rides in an arcuate slot 142 in the face of the plate 98 to bias the assembly 96 and thus resiliently urge the tape 117 into frictional engagement with the peripheral surface of the billet 101 as the assembly 96 rotates about the longitudinal axis of the billet 101.

Figure 5:
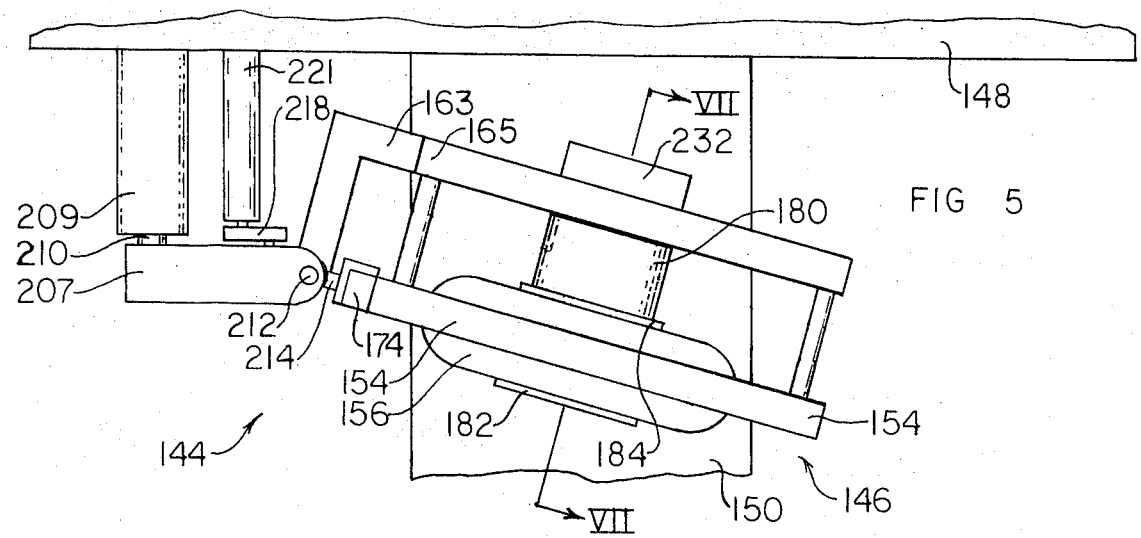
FIG. 5 is a fragmentary, plan view of still another magnetic inspection apparatus, which is constructed in accordance with the present invention for the detection of flaws in an object.
Figure 7:
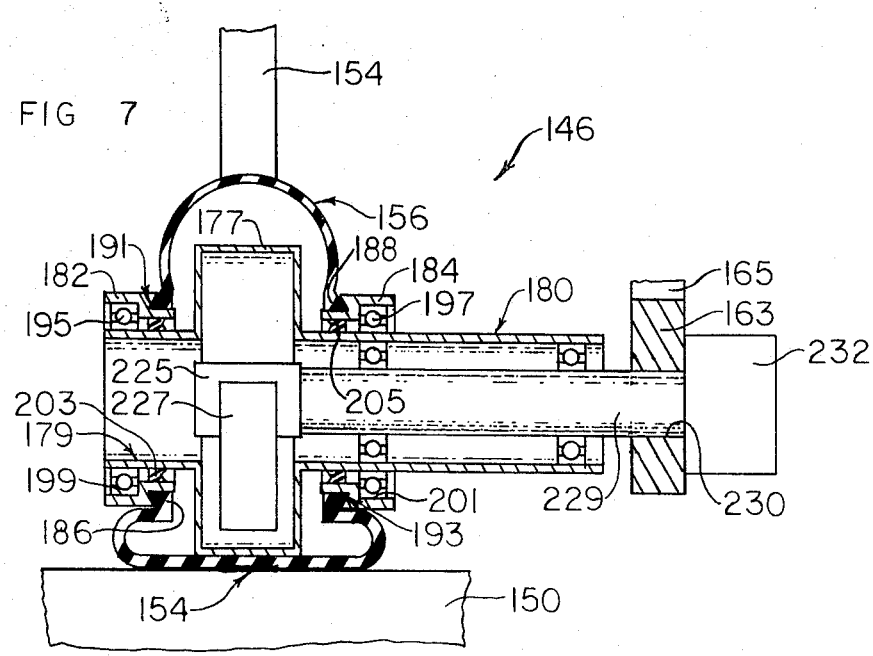
FIG. 7 is a fragmentary, cross-sectional view taken through the apparatus of FIG. 5 substantially along the line VII—VII thereof.
Figure 6:
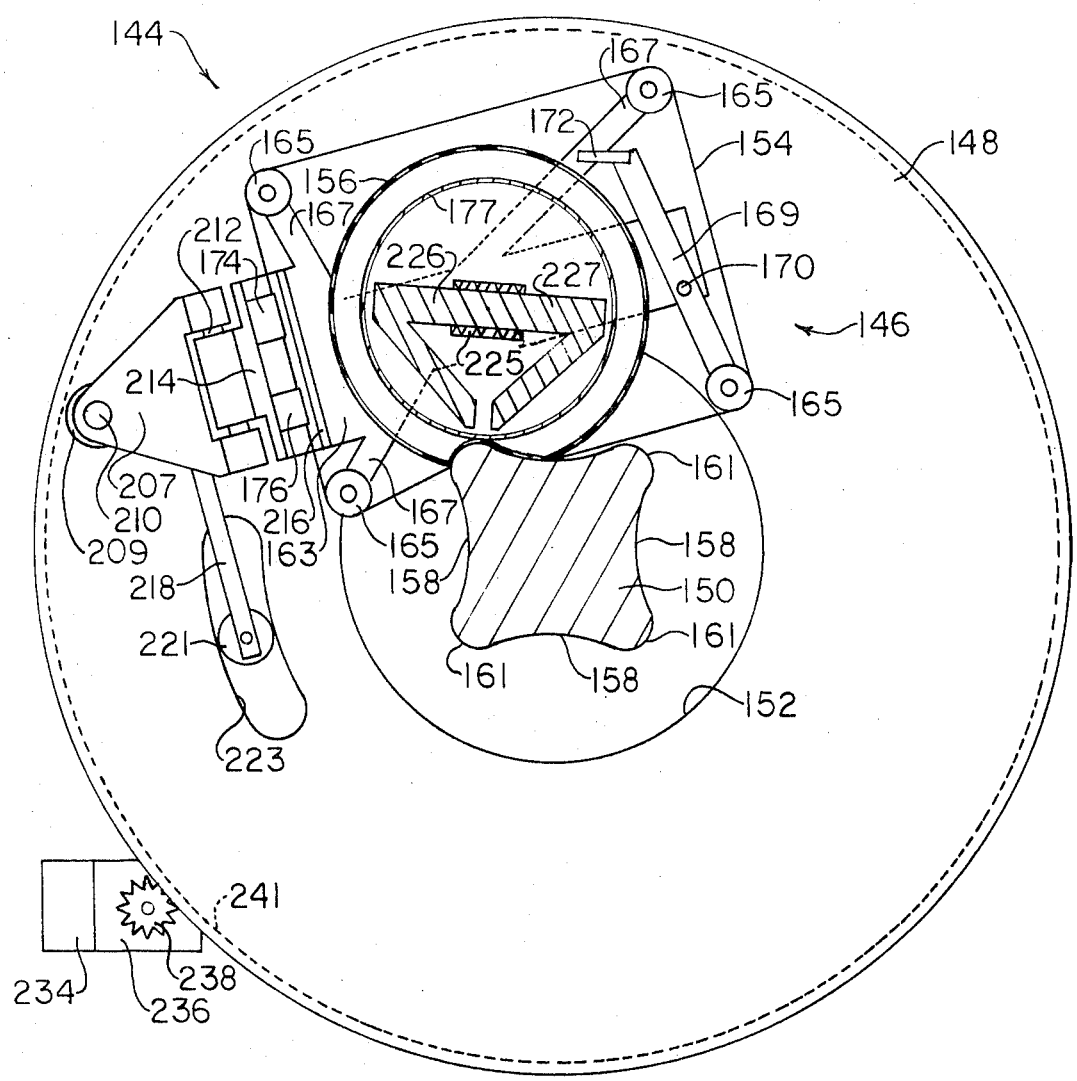
FIG. 6 is an elevational view on a reduced scale of the apparatus of FIG. 5.

Referring now to FIGS. 5, 6 and 7 of the drawings, there is shown a portion of a magnetic inspection apparatus 144, which is constructed in accordance with the present invention, and which is similar to the apparatus of FIG. 1 except that the rotating recording assembly of the apparatus 144 includes means for maintaining the magnetic tape in engagement with concave or depressed surface areas of the peripheral surface of an object having an irregularly shaped cross section. Also, the apparatus 144 differs from the apparatus of FIG. 1 by further including a means for adjusting automatically the position of the biasing coil to maintain it in a direction normal to the peripheral surface of the irregularly shaped object to be inspected. The apparatus 144 includes a rotatable recording assembly 146 mounted on a rotatable motor-driven annular support plate 148, which is similar to the support plate 22 of FIG. 1, for magnetically inspecting a magnetic object, such as the generally square-shaped elongated billet 150 which is fed lengthwise through a circular opening 152 in the support plate 148 past the rotating assembly 146. An endless magnetic tape or belt is entrained for movement on the assembly 146 in a counterclockwise direction as viewed in FIG. 6, and has a portion thereof pressed into engagement with the peripheral surface of the billet 150 in a manner similar to the tape 43 of FIG. 1. A resilient hollow, inflated tire roller 156 presses the tape 154 against the outer peripheral surface of the billet 150. In this regard, the billet 150 has concave sides 158 with rounded corners 161, whereby the tire roller 156 holds the moving tape 154 in place in firm engagement with the outer peripheral contour of the moving billet 150 as the assembly 146 rotates thereabout. While the billet 150 is generally square in cross section, it is to be understood that various different sizes and shapes of elongated objects may also be inspected. As shown in FIG. 6, as the tape 154 moves about the rounded corners 161, the tire roller 156 maintains the tape 154 in firm engagement therewith. The tire roller 156 is inflated via a valve (not shown) to a sufficient pressure to maintain the tape 154 in contact with the billet 150, including its concave sides and rounded corners.

Considering now the rotating recording assembly 146 in greater detail, the assembly 146 includes a support frame 163 having four guide rollers 165 for guiding the tape 154 through a rectangular-shaped closed loop. Three fixed arm portions 167 of the frame 163 rotatably support three of the rollers 165, and an arm or lever 169 which is pivotally mounted on the frame 163 at 170 intermediate the ends of the arm 169 rotatably supports a fourth one of the rollers 165 so that a spring 172 stretched between the arm 169 and one of the arms 167 resiliently tensions the tape 154. A pick-up head 174 is mounted on the frame 163 adjacent the path of travel of the tape 154 to read the recorded flux signals from the tape 154, and an erase head 176 mounted on the frame 163 adjacent the path of travel of the tape 154 erases the tape 154 after the tape moves past the pick-up head 174. The tire roller 156 is annular in shape and is composed of a resilient material, such as rubber. An inner guide wheel 177 has a channel-shaped cross section and is rotatably mounted on the frame 163 within the inflated tire 156 to serve as a back-up surface, against the flat outer peripheral surface of which the tire roller 156 is deformed or flattened by the assembly 146 pressing the tape 154 against the peripheral surface of the billet 150. A forwardly extending hub 179 and a longer rearwardly extending hub 180 of the wheel 177 rotatably support a pair of rims 182 and 184, respectively, which are sealably fixed to the tire roller 156. A pair of angularly shaped beads 186 and 188 on opposite sides of the tire roller 156 are seated in the respective complementary shaped peripheral grooves or notches 191 and 193 of the rims 182 and 184. A pair of bearings 195 and 197 fit in a pair of internal peripheral recesses 199 and 201 of the respective rims 182 and 184 to journal the rims for rotation about the hubs 179 and 180 to permit the tire roller 156 to rotate thereabout as the assembly 146 rotates about the axis of the billet 150. A pair of O-rings 203 and 205 seal the respective rims 182 and 184 to the respective hubs 179 and 180.

In order to support the assembly 146 from the support plate 148, an arm 207 is pivotally connected to a post or block 209, which is mounted to the face of the plate 148, by means of a pivot shaft 210, and is pivotally connected to the frame 163 at 212 in the same manner as the assembly 24 of FIG. 1. As best seen in FIG. 6, an arm or extension 214 of the frame 163 at the pivot point 212 supports the head 174 and 176 in a spaced-apart relationship and has a depending plate portion 216, which is disposed opposite the heads 174 and 176 in a spaced-apart relationship in the same manner as the plate 76 of FIG. 2. A spring 218 is stretched between the arm 207 and a post 221 which rides in an arcuate slot 223 to serve the same purpose as the spring 65 of FIG. 1.

A magnetic biasing coil 225 is rotatably mounted on the frame 163 within the inner guide wheel 177 and is wrapped about a web portion 226 of a generally U-shaped yoke 227, which is similar to the coil 81 and the yoke 83 of FIG. 2 and which is adapted to magnetize the tape 154 to provide a biasing field therefor and thus to sensitize the tape. The guide wheel 177 maintains the billet-engaging portion of the tape 154 spaced from the yoke 227 by a predetermined distance. As best seen in FIG. 7, a shaft 229 is journaled for rotation within the longer rearwardly extending hub 180 of the inner wheel 177 and has one of its ends fixed to the coil 225 and has its opposite end extending through an aligned hole 230 in the frame 163 and into a casing 232 of a servo motor which rotates the shaft 229 to adjust continuously the position of the coil 225 and its yoke 227, whereby the biasing magnetic field produced by the coil 225 is maintained normal to the external peripheral surface of the billet 150 and thus the portion of the tape 154 engaging the billet, as the assembly 146 rotates thereabout. Thus, as the assembly 146 rotates about the billet 150, the servo motor continuously adjusts the position of the yoke 227 as the tape 154 rolls along the irregular contour of the billet 150, whereby the tape 154 is uniformly magnetized with a biasing magnetic field for sensitivity purposes. In this regard, if the position of the yoke 227 were not continuously adjusted, the biasing field would not be directed normal to the entire surface of the billet 150 and thus the portion of the tape engaging the billet, whereby inaccuracies in recording the flux pattern would result.

As shown in FIG. 6, a four-quadrant potentiometer 234 controls the servo motor as the assembly 146 rotates and is connected via a speed reducer 236 to a gear 238, which meshes with and is driven by a set of recessed gear teeth 241 extending about the periphery of the rotatable support plate 148. In this regard, as the plate 148 rotates, the gear 238 is driven by the plate 148 and in turn drives the four-quadrant potentiometer 234 which is electrically connected to the servo motor via slip rings (not shown) to continuously control the servo motor and thus to continuously position the yoke 227 relative to the external peripheral surface of the billet 150. Each one of the quadrants of the potentiometer 234 corresponds to each one of the sides of the billet 150 to position the yoke 227 relative to the peripheral surface of the billet.

In operation, the assembly 146 is pivoted in a counterclockwise direction as viewed in FIG. 6 to permit the end portion of the billet 150 to be fed to a position opposite the assembly 146. Thereafter the assembly 146 is pivoted about its pivot point 210 in a clockwise direction until the tape 154 engages the outer peripheral surface of the billet 150. The motor-driven plate 148 then commences rotation about the axis of the billet 150. In so doing, the tire roller 156 rotates about its axis and presses the tape 154 against the surface of the billet 150. The tire roller 156 is thus flattened between the flat peripheral outer surface of the inner wheel 177 and the billet 150, and rotates about its axis, whereby the tape 154 is driven into movement about the guide rollers 165. Moreover, both the inner wheel 177 and the tire roller 156 rotate about the axis of the shaft 229 as the assembly 146 rotates. After the assembly 146 commences rotation, the billet 150 is fed past the rotating assembly 146 in the same manner as the apparatus 10 of FIG. 1. In response to the potentiometer 234, the servo motor causes the yoke 227 to rotate about its axis to maintain the biasing magnetic field in a direction normal to the surface of the billet 150. Thus, the entire surface area of the billet 150 may be inspected by the apparatus 144, and the biasing magnetic field generated by the coil 225 is maintained normal to the entire peripheral surface of the billet 150.

Figure 8:
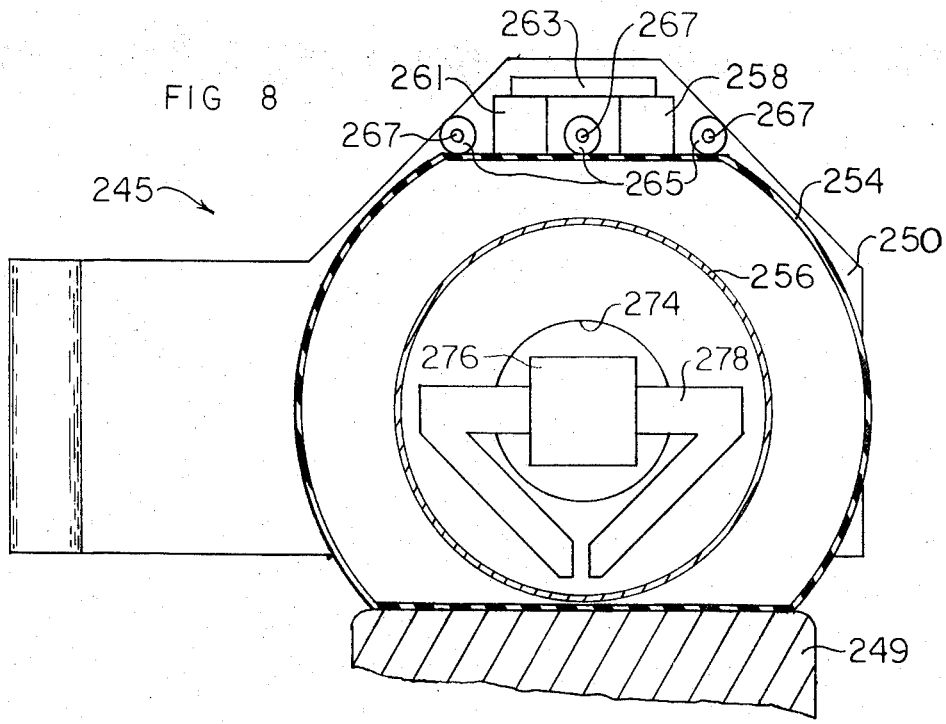
FIG. 8 is a cross-sectional, fragmentary elevational view of yet another magnetic inspection flaw detecting apparatus, which is constructed in accordance with the present invention.
Figure 9:
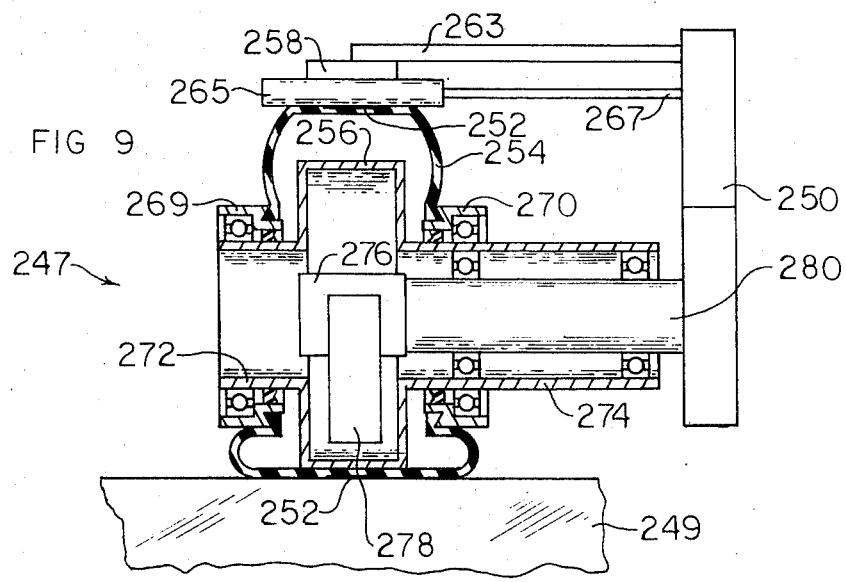
FIG. 9 is a cross-sectional, side elevational view of the apparatus of FIG. 8.

Referring now to FIGS. 8 and 9 of the drawings, there is shown a portion of a magnetic inspection apparatus 245 which includes a rotating recording assembly 247 which is constructed in accordance with the principles of the present invention, and which is similar to the recording assembly 146 of FIG. 5 except that the magnetic tape of the apparatus 245 is not separate from the tire roller. The rotating assembly 247 is adapted to rotate about the longitudinal axis of an elongated square-shaped billet 249 for inspection purposes, but it is to be understood that the apparatus 245 may also be used to inspect other types and shapes of elongated objects composed of magnetic material. The rotating recording assembly 247 includes a support frame 250 which is pivotally mounted to a rotatable motor-driven annular support plate (not shown) in the same manner as the assembly 146 of FIG. 5, and as shown in FIG. 9, a magnetic tape or belt 252 which is integral with and extends about the outer peripheral surface of an annular tire roller 254, which is similar to the tire roller 156 of FIG. 5. The tape 252 is secured to the tire roller 254 by any suitable technique so that the tape does not slip relative to the tire roller. An inner wheel 256 is similar to the inner wheel 177 of FIG. 5 and is disposed within the inflated tire roller 254 and is rotatably mounted on the frame 250. A pick-up head 258 and an erase head 261 are supported by an arm 263 extending from the frame 250 and are disposed diametrically opposite the portion of the tape 252, which is pressed into engagement with an outer peripheral surface of the billet 249, to serve the same purpose as the heads 174 and 176 of FIG. 6. A series of rollers 265 are rotatably mounted on the frame 250 by means of a series of rods 267, and are disposed in alignment with the heads 258 and 261 to flatten the surface of the tire roller 254 and the tape 252 so that the heads 258 and 261 can engage the tape 252.

a pair of rims 269 and 270 are rotatably mounted on the respective forwardly extending hub 272 and the rearwardly extending hub 274 of the inner wheel 256, and are sealed to and secured to the tire roller 254 in the same manner as the rims 182 and 184 of FIG. 7. A biasing coil 276 is wrapped about a yoke 278 and is disposed within the inner wheel 256 in the same manner as the biasing coil 225 and the yoke 227 of FIG. 6. Likewise, a fixed rod 280 extends through the longer rearwardly extending hub 274 and has one of its ends connected to the coil 276 with its opposite end mounted to the frame 250 to rigidly support the coil 276 and its yoke 278 in position for magnetizing and thus sensitizing the tape. It should be understood that a servo mechanism may also be employed to movably position the yoke 278 where irregular-shaped billets are to be inspected.

Without further elaboration, the foregoing will so fully explain the character of the invention that others may, by applying current knowledge, readily adapt the same for use under varying conditions of service, while retaining certain features which may properly be said to constitute the essential items of novelty involved, which items are intended to be defined by the following claims.

We claim as our invention:

1. In apparatus for magnetic inspection of an elongated object of magnetic material in the form of a square billet or the like having corner portions projecting from a central longitudinal axis a radial distance greater than the radial distance to other portions thereof, a support structure, support means for effecting relative rotation of said support structure and said object about said longitudinal axis of said object, a flat belt having a narrow width equal to a small fraction of the average transverse dimension of said object, belt support and entraining means for entraining said belt on said support structure for longitudinal movement of said belt in a predetermined path relative to said support structure, said predetermined path being such that only a first surface portion of limited area of one face of said belt is engaged with a surface portion of said object, pressure means associated with said entraining means and acting directly on a second surface portion of limited area of the opposite face of said belt and aligned and coextensive with said first surface portion for pressing said first surface portion into intimate contact with said surface portion of said object during relative rotation of said support structure and said object, and means for effecting relative movement of said support means and said object in the direction of said longitudinal axis of said object, said belt support and entraining means including means for allowing radial movement of said first surface portion to accommodate corner portions of said object and for causing said first surface portion to follow a generally helical path about the surface of said object while being maintained by said pressure means in intimate contact with the surface of said object, said belt including a magnetic material for recording along the length of said belt the magnetic flux pattern along the surface of said object engaged by said belt during relative rotation of said support structure and said object.

2. In apparatus as defined in claim 1, said pressure means including engagement means engaged with said second surface portion and movable relative to said support structure while being held against movement relative to said surface portion of said object by frictional engagement with said second surface portion and frictional engagement between said first surface portion and said surface portion of the object.

3. In apparatus as defined in claim 2, said entraining means including a guide roller journalled on a rotational axis generally parallel to the longitudinal axis of the object with the center of said first and second surface portions being on a line transverse to and through said rotational axis and the longitudinal axis of said object, said engagement means being defined by a peripheral portion of said guide roller engaged with said second surface portion of said belt.

4. In apparatus as defined in claim 1, said pressure means including resiliently deformable means engaged with said second surface portion of said opposite face of said belt.

5. In apparatus as defined in claim 4, said resiliently deformable means comprising a hollow flexible inflated tire roller.

6. In apparatus as defined in claim 5, said belt being carried by a peripheral portion of said tire roller.

7. In apparatus as defined in claim 5, said entraining means including a plurality of roller means entraining said belt for movement in said predetermined path, said tire roller being engaged with a portion of said belt between a pair of said roller means.

8. In apparatus as defined in claim 1, magnetic yoke means for producing a biasing field in the region of the portion of the object engaged by said first surface portion of said one face of said belt.

9. In apparatus as defined in claim 8, said magnetic yoke means being supported from said support structure.

10. In apparatus as defined in claim 8, said magnetic yoke means being supported independently of said support structure in fixed angular relationship with respect to the longitudinal axis of said object.

11. In apparatus as defined in claim 1, said belt support and entraining means being pivotally supported on said support structure for pivotal movement about a pivot axis in a plane generally transverse to said longitudinal axis of said object and in spaced generally parallel relation to a radial line extending from said longitudinal axis of said object through the area of interengagement of said first surface portion of said belt and the surface of said object to allow said first surface portion of said belt to follow said generally helical path about the surface of said object.

* * * * *